US008805725B2

(12) United States Patent
Calman

(10) Patent No.: US 8,805,725 B2
(45) Date of Patent: Aug. 12, 2014

(54) PAYMENT VEHICLE RECOMMENDATIONS BASED ON PAYMENT RULES

(75) Inventor: Matthew A. Calman, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 13/525,850

(22) Filed: Jun. 18, 2012

(65) Prior Publication Data

US 2013/0339165 A1 Dec. 19, 2013

(51) Int. Cl.
 *G06Q 20/00* (2012.01)
(52) U.S. Cl.
 USPC ................. 705/16; 705/17; 705/18; 705/21; 705/35; 705/42
(58) Field of Classification Search
 None
 See application file for complete search history.

(56) References Cited

U.S. PATENT DOCUMENTS

| | | | | |
|---|---|---|---|---|
| 7,318,049 B2* | 1/2008 | Iannacci | ......................... | 705/39 |
| 7,464,859 B1* | 12/2008 | Hawkins | ....................... | 235/379 |
| 7,591,419 B2* | 9/2009 | Eckert | ............................ | 235/380 |
| 7,742,994 B1* | 6/2010 | Gupta | ............................. | 705/64 |
| 7,827,056 B2* | 11/2010 | Walker et al. | ............... | 705/14.23 |
| 7,831,521 B1* | 11/2010 | Ball et al. | ........................ | 705/39 |
| 8,065,233 B2* | 11/2011 | Lee et al. | ......................... | 705/44 |
| 8,157,165 B2* | 4/2012 | Eckert | ............................ | 235/380 |
| 8,326,754 B2* | 12/2012 | Bandych et al. | ................ | 705/40 |
| 8,452,708 B1* | 5/2013 | Birenbaum et al. | ............ | 705/40 |
| 2008/0027844 A1* | 1/2008 | Little et al. | ..................... | 705/35 |
| 2009/0018923 A1* | 1/2009 | Chen et al. | ..................... | 705/17 |
| 2009/0144194 A1* | 6/2009 | Dickelman | ..................... | 705/39 |
| 2009/0292607 A1* | 11/2009 | Eckert | ........................ | 705/14.38 |
| 2010/0211445 A1* | 8/2010 | Bodington | ................. | 705/14.17 |
| 2012/0016728 A1* | 1/2012 | Ahmad et al. | ............. | 705/14.23 |

FOREIGN PATENT DOCUMENTS

| | | |
|---|---|---|
| KR | 2008/0111433 A | 12/2008 |
| KR | 2011/0109061 A | 10/2011 |

\* cited by examiner

*Primary Examiner* — Fateh Obaid
(74) *Attorney, Agent, or Firm* — Michael A. Springs; Moore & Van Allen PLLC

(57) ABSTRACT

Systems and methods for providing payment vehicle recommendations are provided herein. In the systems and methods, a transaction associated with one of a transaction amount and purchase items is identified based on the transaction data; one or more payment rules associated with the transaction are identified; the terms of the one or more payment rules are compared with the transaction amount or purchase items; the most favorable payment vehicle for the transaction is determined based on the comparison of the terms of the one or more payment rules and the transaction amount or purchase items; and a recommendation of at least one payment vehicle is provided based on the determination of the most favorable payment vehicle on a display of a mobile device of a user.

20 Claims, 9 Drawing Sheets

PAYMENT VEHICLE RECOMMENDATIONS BASED ON PAYMENT RULES

BACKGROUND

Consumers typically have a wide range of payment methods to choose from when making purchases. Credit cards, debit cards, automatic electronic funds transfers, paper funds such as cash and checks, as well as mobile payments are all available and used by consumers. Additionally, consumers may use digital or physical loyalty cards and coupons at the point of sale. Depending on the terms, programs, and laws associated with the payment method, certain payment methods may be more beneficial or provide more protection to consumer than other methods. Quickly and easily determining the best payment method to use at a point of sale can be difficult due to the complicated details of the laws and benefits associated with the consumer's payment options.

BRIEF SUMMARY

The embodiments provided herein are directed to a system for providing payment vehicle recommendations to a user. The system includes: a computer apparatus including a processor and a memory; and a payment software module stored in the memory, comprising executable instructions that when executed by the processor cause the processor to: receive transaction data; identify a transaction associated with one or more transaction parameters included in the transaction data; identify one or more payment rules associated with the user; compare the terms of the one or more payment rules with the one or more transaction parameters; determine payment vehicles that meet the terms of the one or more payment rules based on the comparison of the terms of the one or more payment rules and the one or more transaction parameters; and provide on a display of a mobile device of the user that is in communication with the system a recommendation of at least one payment vehicle based on the determination of the payment vehicles that meet the terms of the one or more payment rules. In some embodiments, the one or more transaction parameters include a transaction amount or items for purchase.

In some embodiments of the system, the module is further configured to: identify payment vehicles that are associated with the mobile device; and calculate account balances of the payment vehicles. The module is further configured to: determine that each of the account balances is greater than the transaction amount, wherein the transaction amount comprises a total transaction amount. The module is further configured to: determine that the transaction amount is less than each of the account balances; and provide a notice to the user on the display of the mobile device. The module is further configured to: identify payment vehicles available to the user that are external to the mobile device; and recommend the external payment vehicles to the user.

In other embodiments of the system, the module is configured to: determine that the transaction amount is greater than a threshold amount; and recommend a payment vehicle that is in compliance with a consumer protection rule. The module can be further configured to: segregate the purchase items into one or more categories; and calculate the total transaction amount of each of the one or more categories. The module can be further configured to calculate a first account balance of a first payment vehicle; determine that the first account balance is greater than the total transaction amount of a first category of the one or more categories; recommend the first payment vehicle to the user; calculate a second account balance of a second payment vehicle; determine that the second account balance is greater than the total transaction amount of a second category of the one or more categories; and recommend the second payment vehicle to the user.

In other embodiments of the system, the module is configured to: segregate the purchase items into a first category of item types and a second category of item types; and determine that the first category of item types are eligible under the terms of a first payment rule and that the second category of item types are eligible under the terms of a second payment rule, wherein the at least one payment vehicle comprises a first payment vehicle associated with the first payment rule and a second payment vehicle associated with the second payment rule to the user. In some embodiments, the first category of item types is associated with a first merchant and the second category of item types is associated with a second merchant. In other embodiments, the transaction is associated with a period of time, a transaction frequency, or a merchant.

In still other embodiments of the system, the module is further configured to: compare the terms of the one or more payment rules with the merchant; and determine that the merchant is eligible under the terms of the one or more payment rules, wherein the at least one payment vehicle comprises a payment vehicle that is accepted by the merchant. The module can be further configured to: determine a second transaction; identify second purchase items associated with the second transaction; and
determine that the first purchase items comprise at least one of the second purchase items, wherein the at least one payment vehicle comprises a payment vehicle used in the second transaction and wherein the second transaction occurs prior to the first transaction.

In some embodiments, a method for providing payment vehicle recommendations to a user is provided. The method includes receiving transaction data; storing the transaction data in a storage device; identifying, via a computer device processor, a transaction associated with one of a transaction amount and purchase items based on the transaction data; identifying, via a computer device processor, one or more payment rules associated with the transaction; comparing, via a computer device processor, the terms of the one or more payment rules and the transaction amount or purchase items; determining, via a computer device processor, the most favorable payment vehicle for the transaction based on the comparison of the terms of the one or more payment rules and the transaction amount or purchase items; and providing, via a computer device processor, a recommendation of at least one payment vehicle based on the determination of the most favorable payment vehicle on a display of a mobile device of the user.

In some embodiments of the method, the transaction is associated with a period of time, a transaction frequency, or a merchant. In other embodiments, the method further includes determining, via a computer device processor, that a first payment vehicle has been used at least once during the period of time; determining, via a computer device processor, that a second payment vehicle has not been used during the period of time; comparing the terms of the payment rule to the transaction frequency of the first payment vehicle and the second payment vehicle, wherein the at least one payment vehicle comprises the second payment vehicle. In still other embodiments, the method further includes segregating the purchase items into a first category of item types and a second category of item types; and determining that the first category of item types are eligible under the terms of a first payment rule and that the second category of item types are eligible under the terms of a second payment rule. In additional embodiments, the transaction data is received from a point of sales device.

Also provided in the embodiments presented herein is a computer program product for providing payment vehicle recommendations to a user, the computer program product comprising: a computer readable storage medium having computer readable program code embodied therewith, the computer readable program code comprising: a computer readable program code configured to receive transaction data; a computer readable program code configured to store the transaction data in a storage device; a computer readable program code configured to identify a transaction associated with one of a transaction amount and purchase items based on the transaction data; a computer readable program code configured to identify one or more payment rules associated with the transaction; a computer readable program code configured to compare the terms of the one or more payment rules with the transaction amount or purchase items; a computer readable program code configured to determine the most favorable payment vehicle for the transaction based on the comparison of the terms of the one or more payment rules and the transaction amount or purchase items; and a computer readable program code configured to provide a recommendation of at least one payment vehicle based on the determination of the most favorable payment vehicle on a display of a mobile device of the user that is in communication with the system. In other embodiments of the computer program product, the product further includes computer readable program code configured to identify payment vehicles that are associated with the mobile device; calculate account balances of the payment vehicles; determine that the each of the account balances is greater than the transaction amount.

BRIEF DESCRIPTION OF THE SEVERAL VIEWS OF THE DRAWINGS

The present embodiments are further described in the detailed description which follows in reference to the noted plurality of drawings by way of non-limiting examples of the present embodiments in which like reference numerals represent similar parts throughout the several views of the drawings and wherein.

DETAILED DESCRIPTION

Figure 1A:
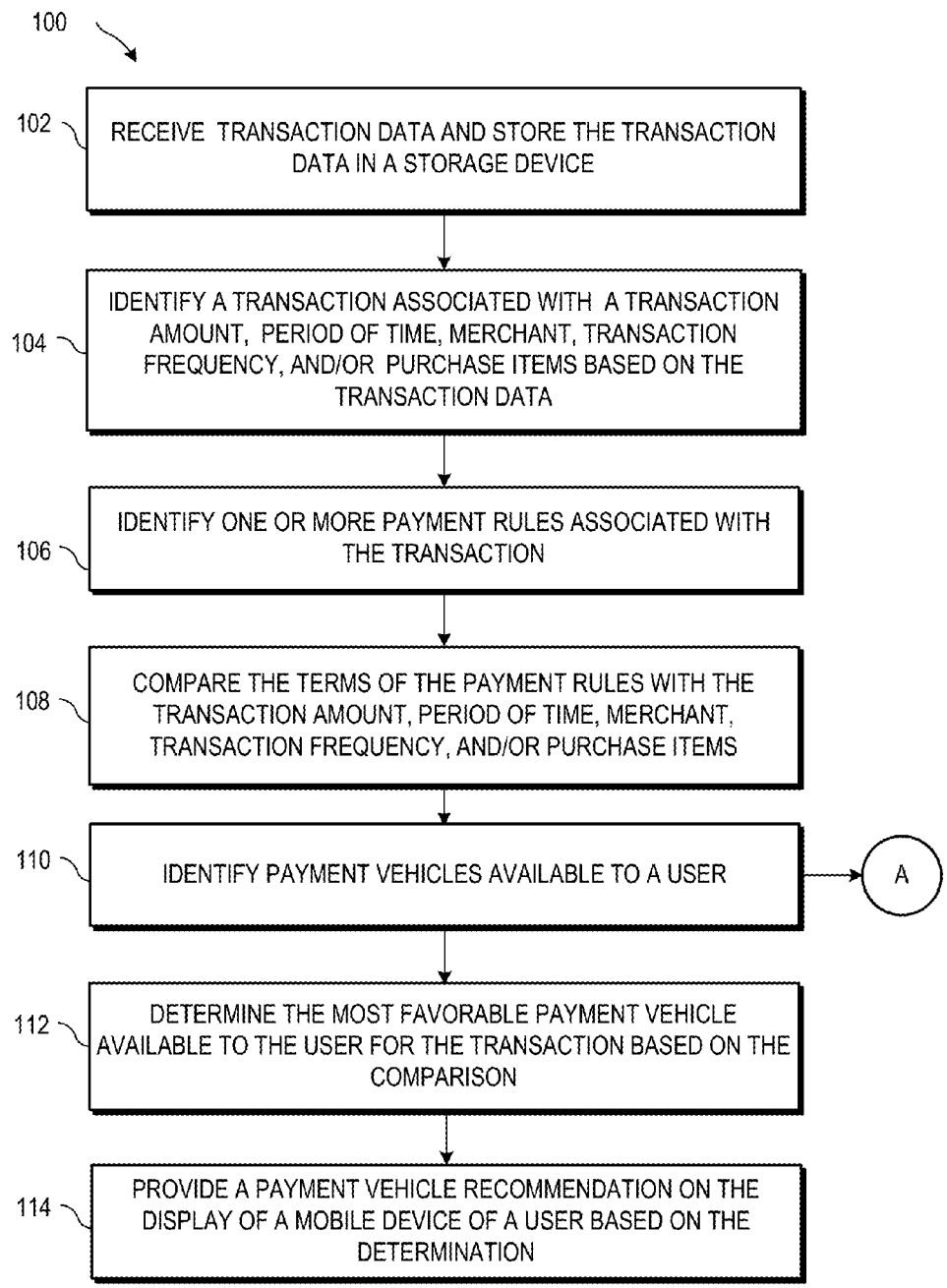
FIGS. 1A-1B are flowcharts illustrating a system and method for recommending payment vehicles in accordance with various embodiments of the invention.

The embodiments presented herein are directed to systems and methods for recommending payment vehicles based on payment rules such as government regulations. A system and method compare transaction data and regulations to determine the most favorable regulation associated with a particular transaction. Based on this determination, a recommendation of a particular payment vehicle for a particular transaction is sent to a user.

As will be appreciated by one skilled in the art, aspects of the present embodiments of the invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present embodiments of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present embodiments of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As presented herein, embodiments that enhance and maintain customer relationships with a financial institution by providing payment vehicle recommendations to the user are provided. As used herein, the terms "payment vehicle" refers to, but is not limited to, payment methods or transaction channels for carrying out a transaction. Exemplary payment vehicles include credit cards, debit cards, mobile wallet transaction channels (e.g., cloud-based, wireless, and near field communication (NFC) based channels), cash, checks, electronic funds transfer channels, and the like.

Figure 1B:
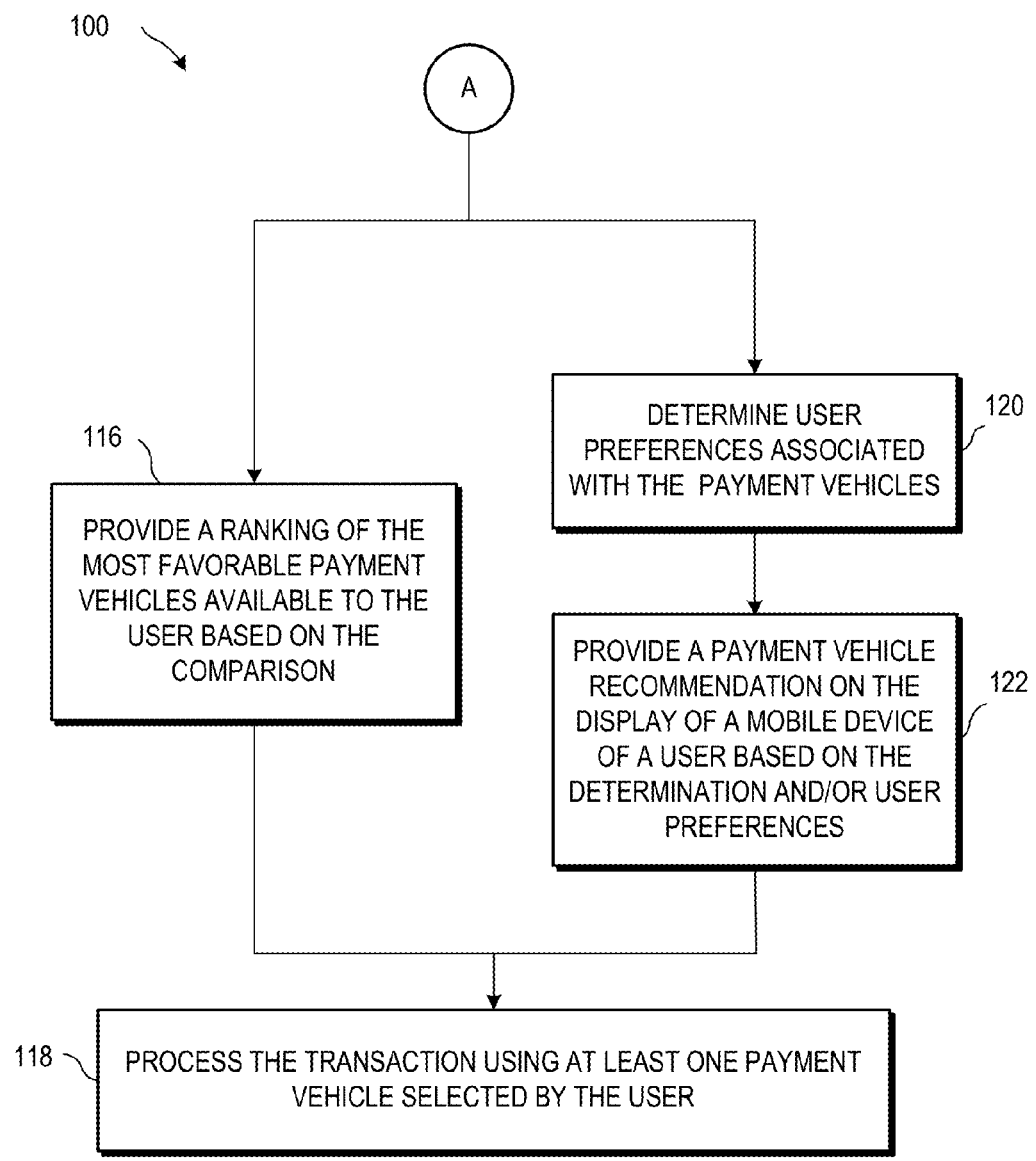

FIGS. 1A-1B are flowcharts providing an overview of a system and method 100 for providing payment vehicle recommendations to a user. One or more devices, such as one or more mobile devices and/or one or more other computing devices and/or servers, can be configured to perform one or more steps of the method 100. In some embodiments, the one or more devices performing the steps are associated with a financial institution. In other embodiments, the one or more devices performing the steps are associated with a business, partner, third party, and/or user.

As shown in FIG. 1A, and as illustrated at block 102, the system 100 receives transaction data and stores the transaction data in a storage device (e.g., the user account data repository 680 or the payment recommendation data store 570). A used herein, "transaction data" includes, but is not limited to any data associated with one or more financial accounts such as transaction amounts, inbound transactions, outbound transactions, transaction channels, transaction dates, identification of third parties to a transaction, payee names, purpose of transactions, transaction transfer data, types of accounts, terms of an account, terms of a transaction, identification of products purchased, identification of services purchased, transaction costs, account costs, merchant based or product based promotions, rewards associated with an account, and the like. The transaction data may be received from a user, merchants, other financial institutions such as credit card companies, or any other entity. For example, the transaction data may be communicated from a point of sales (POS) device of a merchant and/or a mobile device of a user.

As illustrated at block 104, the system 100 identifies a transaction associated with a transaction amount, period of time, merchant, transaction frequency, and/or purchase items based on the transaction data. The transaction amount includes a total transaction amount for the transaction and/or a cost amount of one or more of the purchase items. For example, the transaction amount may include an amount of $48.07, which is the total purchase amount for two items, and may further include individual costs of $12.19 and $32.88 for each item purchased. The transaction amounts may further include, for example, a discount amount associated with the total transaction or physical items, gratuity amounts, and tax amounts. The purchase items include any items to be purchased by the user, including tangible and intangible goods and services. Algorithms, rules, keywords, Boolean, and other search logic can be used to search the transaction data to identify transaction amounts and/or the purchase items. Keywords may include certain product identifying terms, business names, merchant codes, web addresses, symbols (e.g., $), and the like.

In some embodiments, the transaction amount comprises a total transaction amount that is equal to, greater than, or less than a threshold amount. For example, only purchases greater than $500 may be tagged. In other embodiments, the transaction amount comprises a purchase amount associated with one or more of the physical items that is equal to, greater than, or less than a threshold amount. In still other embodiments, the purchase items that are associated with a particular category. For example, one or more of the purchase items may be segregated into edible or food categories and inedible categories, health care categories, reading material categories, and the like. The purchase items in each category may be further segregated into sub-categories such as text books for reading materials, dental implants for the health care category, and milk for the food category, the like.

As illustrated at block 106, the system 100 identifies one or more payment rules associated with the transaction. The payment rules comprise payment vehicle laws, international and national laws, as well as agency or government regulations, rules, decisions, programs, principles, merchant based policies, financial institution based policies, or instructions that allow a certain result. The payment rules include laws directed to consumer protections, privileges, and rights as well as merchant and financial institution's rights and prohibitions. Exemplary payment rules include consumer benefits that are administered by state and federal agencies such as assistance programs and grants for food and nutrients, health care, shelter, disaster relief, clothing, counseling, loans, and the like. The payment rules may further include consumer protections directed to banking, banking cards, electronic fund transfers, credit cards, debit cards, and other financial services and payment vehicles.

As illustrated at block 108, the system compares the terms of the payment rules with the transaction amount, period of time, merchant, transaction frequency, and/or purchase items. In some embodiments, the terms of the payment vehicle comprise purchase item restrictions, purchase amount restrictions, payment vehicle type restrictions, payment vehicle use frequency restrictions, and time period restrictions. For example, under various federal and state nutritional assistance programs such as food stamps, the Supplemental Nutritional Assistance Program (SNAP), the Special Supplemental Nutritional Program for Women, Infants, and Children (WIC), and other food assistance programs, a user may only purchase food items in order to receive the benefits provided by the programs. For SNAP, a user is given a debit card, such as an electronic benefits transfer (EBT) card to purchase food, and for WIC, a user is given a check to pay for food. Further, under certain food assistance programs, the food items that may be purchased may be restricted (e.g., infant formula food, eggs, milk, etc.) and/or certain food items (such as alcohol) may be prohibited. In some cases, the food assistance program may be restricted to a certain amount or purchase frequency. For example, a user's debit card may only be credited with a certain amount of money twice a month, or the user may only receive a check for a certain amount once a year.

In another example, programs that help fund a user's health care expenses such as a flexible spending account (FSA), a health savings account (HSA), or a health reimbursement account (HRA) may provide certain purchase item and merchant restrictions. For example, a user may only be allowed to use a FSA debit card (e.g., Flexcard) with certain merchants such as medical providers, grocers, pharmacies, and the like. Further, the merchants may be required to identify and segregate items or codes that are eligible under the user's FSA or other health plan such as prescription drugs, medical supplies, medical services, and the like. Further, the health account may have certain time and amount restrictions. For example, funds in a FSA account may be limited to $2,000 a year and the funds may only be used over the course of a one year period.

Moreover, certain payment rules can provide certain protections to the user based on the payment vehicle used for the transaction. For example under some consumer protection laws, some gift cards, mass transit passes, prepaid phone cards, and merchant issued cards may not cover losses or misuse while other forms of payment such as credit cards or electronic funds transfers may be provided with greater protection under such laws. The terms of some consumer protection laws may require action from the user (e.g., reporting misuse of a bank account or bank card) and may require that the action be taken in a certain time period in order for the user to benefit from the protections under the laws.

Although purchase transactions are illustrated with regard to FIGS. 1A-1B, it will be understood that the embodiments further include other types of transactions such as withdrawals, including ATM withdrawals, and electronic funds transfers such as automatic bill pay. For example, under the terms of certain assistance programs, certain qualified individuals and families may receive cash benefits that are deposited to an EBT card. Under Transitional Aid to Families with Dependent Children (TAFDC) programs, for example, a qualified user may use the EBT card to make ATM cash withdrawals or facilitate cash back transactions. Further, the user benefiting from the TAFDC program may not be restricted to certain purchase items, such as food, when using the EBT card for making purchases. Further, under some consumer protection laws, a user may have the ability to stop or dispute an automatic bill payment. For example, if a utilities company overcharges a user, the user can stop the automatic electronic funds withdrawal from their checking account until the issue is resolved.

As illustrated at block 110, the system 100 identifies payment vehicles available to the user. As used herein, the user includes customers of a financial institution, account holders, agents of account holders, and the like. It will be understood that the identification of payment vehicles available to the user, in some embodiments, occurs before the transaction or payment rules are identified. For example, the system 100 may first identify the payment vehicles available to the user and then identify the payment rules associated with the available payment vehicles to further refine the process. In some embodiments, the payment vehicles available to the user comprise payment vehicles associated with a mobile wallet application on the user's mobile device. For example, a user may store data associated with credit cards, debit cards, EBT cards, and the like locally in a memory device of the mobile phone and/or remotely on a server linked to the mobile phone. In other embodiments, the payment vehicles available to the user comprise payment vehicles that are external to the user's mobile phone or mobile wallet. For example, the user may have a WIC check, cash, or bank cards that are not stored or otherwise linked to the user's mobile phone.

As illustrated at block 112, the system 100 determines the most favorable payment vehicle available to the user for the transaction based on the comparison. In block 114, the system 100 provides a payment vehicle recommendation on the display of a mobile device of a user based on the determination. The determination of the most favorable payment vehicle is based on any number of variables. In some embodiments, the system 100 determines the eligibility of the transaction associated with the one or more payment rules based on the purchase items, the transaction amount, the period of time, the merchant, and/or the transaction frequency. For example, transactions that include certain foods items or medical items may be at least partially eligible under a food stamp program or health care program. In another example, the system may determine the purchase amount for the eligible purchase items and compare that purchase amount to the funds available in the user's card account (e.g., EBT or FSA) to determine if enough funds are available to make the purchase. In another example, the system may determine that funds are expected to deliver to the user's card account at a later time. In still another example, the system may determine that the merchant is or is not authorized to process certain payment vehicles. Based on such determinations, the system 100 recommends the most favorable payment vehicle to the user.

In some embodiments, credit cards are determined to be the best payment vehicle and are recommended for purchases over a certain threshold amount. For example, for purchases over $500, credit cards may be recommended so that any disputes that may arise after the purchase may afford the user greater protection under certain consumer protection laws. In other embodiments, credit cards are determined to be the best payment vehicle and are recommended for purchases based on the merchant. For example, if a merchant is going out of business or has return policies or other policies that are unfavorable to the user, a credit card may be recommended to the user so that the user may be protected by certain consumer protection laws.

In some embodiments, the most favorable payment vehicle comprises a plurality of payment vehicles. For example, for some transactions, the user may derive approximately the same benefit whether using a first credit card or a second credit card or whether by paying using automatic checking account deductions or credit card charges or cash. If a user has already reached his or her credit limit for a credit card, cash or check may be a better option for the user. In some embodiments, the system 100 segregates the payment vehicle into groups and recommends the group. For example, if a user has four different credit cards and two debit cards in his or her mobile wallet, the system 100 may provide a pop-up display to a user of a credit card group recommendation rather than an individual credit card. The recommendation includes payment vehicles associated with the mobile wallet or the user's mobile device and/or payment vehicles external to the mobile device or mobile wallet.

The system and method 100 is further illustrated in FIG. 1B. In block 116, the system 100 provides a ranking of the most favorable payment vehicles available to the user based on the comparison. For example, an EBT card may be ranked first, a WIC check ranked second, and a credit card ranked third for transactions that are associated with a grocer or that include certain food items. In some embodiments, the payment vehicles are ranked according to the merchant or merchant codes associated with the transaction. For example, the rankings may be based on merchant eligibility under the terms of the payment rule. In a transaction involving the purchase of food, credit cards and debit cards may be ranked first and second and an EBT card may not be recommended at all if the transaction is associated with a restaurant. In some embodiments, the payment vehicles are ranked according to the transaction amount. For examples, purchases or withdrawals under or over a certain threshold amount may be ranked according the terms or balances associated with the payment vehicle account. A first debit card may be ranked higher than a second debit card for automated teller machine (ATM) withdrawals based on the financial entity associated with ATM or the available funds in the account associated with the debit cards.

As illustrated at block 118, the system 100 processes the transaction using a payment vehicle selected by the user. In some embodiments, the system 100 processes the transaction using multiple payment vehicles. For example, the transaction may be split into portions such that a first portion of the transaction is paid using a first credit card or debit card and a second portion of the transaction is paid using a second credit card or debit card. In some embodiments, the system 100 provides information associated with the recommended vehicles. In this way, the user can make an informed decision when selecting the payment vehicle. For example, a pop-up window may be displayed on the user's mobile device when a user clicks on a recommended payment vehicle. In some embodiments, account balances associated with the recommended payment vehicle and/or other payment vehicles are presented to the user. For example, the amount or percentage of available credit associated with a credit card, account balances associated with a debit card, checking account balances, FSA balances, and the like may be provided to the user. In some embodiments, the system notifies the user that a particular payment method has been used a certain the number during a period of time. For example, the user may be notified that he or she has used their credit card eight times in the last month. In additional embodiments, notices of the applicable terms of the payment rule may be presented to the user. For example, a pop-up window that details items that are covered and not covered under a certain law or program, the user's right to dispute a purchased item, and the like may be presented to the user on the user's mobile device. Links to applicable laws and websites may also be presented to the user.

As illustrated at block 120, the system 100 determines user preferences associated with the payment vehicles. In some embodiments, the user preferences include default payment vehicles that are based on the transaction. For example, the default payment vehicle may be based on transactions that are over or under a certain amount, transactions that occur during a certain period of time (e.g., a particular week day, week, month, year, etc.), merchants or merchant codes associated with the transaction, the frequency of a particular type of transaction during a period of time, and/or the items being purchased. The user preferences, in some embodiments, further include criteria for recommending the most favorable payment vehicle available to the user. For example, the user preferences may include a rule that all transaction over $150 should use a particular credit card even if other payment vehicle options are available and more beneficial to the user. As another example, the user preferences may also include user defined rules that are directed specifically to government aid programs, such as WIC, or enrollment of an HAS account. Further, in still another example, users may also enter goals for rewards or charity programs and the system could direct transactions to payment vehicles to maximize achievement of these goals.

As illustrated at block 122, the system provides a payment vehicle recommendation on the display of a mobile device of a user based on the determination and/or user preferences. In some embodiments, the payment vehicle recommendation comprises the most favorable payment vehicle available to the user. For example, the user preferences may include a rule that the most favorable payment vehicle be the default payment vehicle for all or some transactions. In still other embodiments, the user preferences may include a prompt that asks the user to select a payment vehicle for every purchase transaction.

Figure 2:
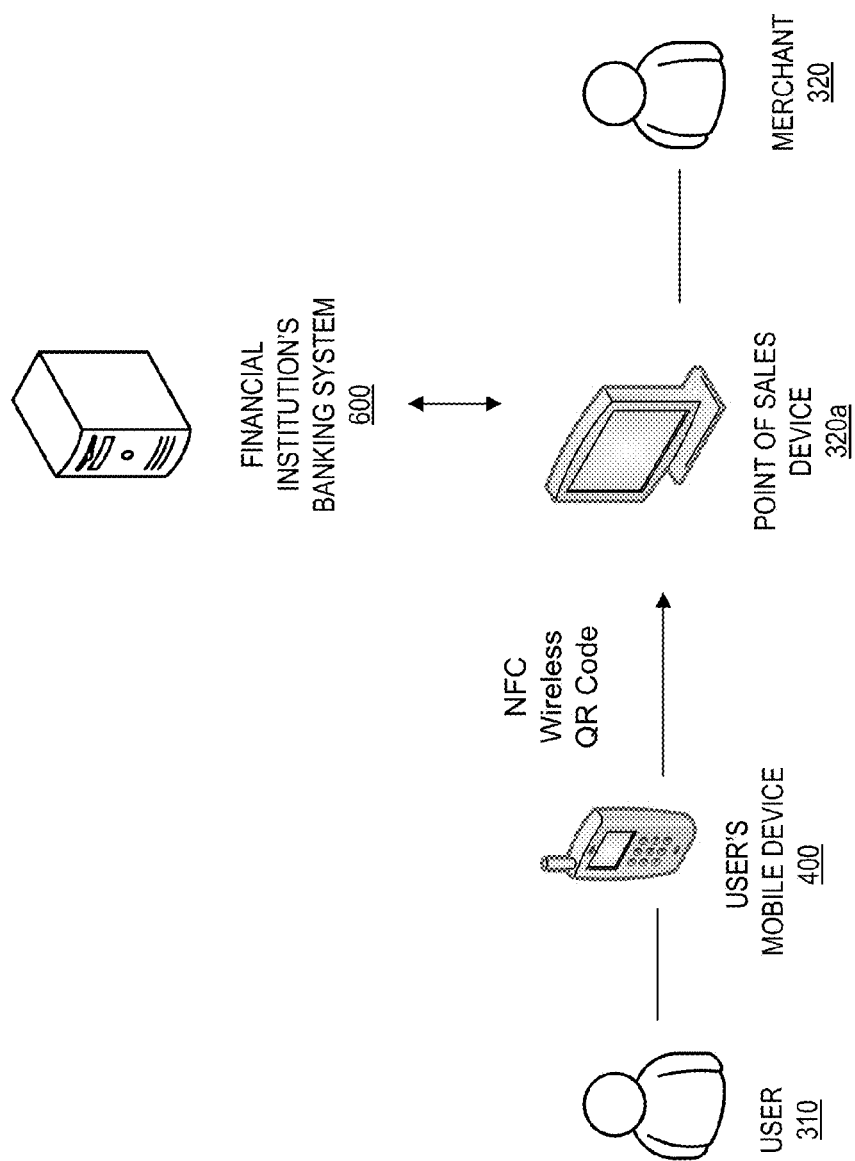
FIG. 2 is a block diagram illustrating the process by which a user may make a payment vehicle decision in accordance with various embodiments of the invention.

FIG. 2 is a block diagram illustrating a non-limiting example by which a user may choose a payment vehicle in accordance with various embodiments of the invention. As shown in the illustrated embodiments, a user 310 uses the user's mobile device 400 to access a mobile wallet application stored on the user's mobile device 400. The user's mobile device 400 links to a point of sales (POS) device 320a maintained by a merchant 320 at checkout. Although the shopping experience depicted in FIG. 2 illustrates a brick and mortar store, the embodiments presented herein also include a virtual store or an online store. The user's mobile device 400 connects with the point of sales device 320a via radio frequency technologies such as near field communication (NFC), QR code, and/or wireless technologies (e.g., Bluetooth™).

For cloud based mobile payments using visual codes, the POS device 320a displays a quick response (QR) or other machine-readable code which can be scanned using a camera on the user's mobile device 400. In some embodiments, a public key infrastructure is provided in which both the merchant and user provides a public key to a third party that acts as an intermediary. The relevant public keys unlock the credentials associated with the user's mobile device 400 and the POS device 320a and the third party stores the credentials using cloud computing technology. For NFC based mobile payments, an NFC chip in the user's mobile device 400 interacts with the POS device 320a. The mobile wallet application may detect the available methods for linking to the POS device 320a and provide the user 310 with linking options or may automatically link to the POS device 320a based on a default linking method or user preferences.

As described herein with regard to FIGS. 1A-1B and 7A-7B, the system 100 provides a payment vehicle recommendation and the user selects a payment vehicle to complete a transaction. The POS device 320a and/or the user's mobile device 400 is in communication with a financial institution's banking system 600 to provide the recommendation to the user's mobile device and/or process the transaction.

Figure 3:
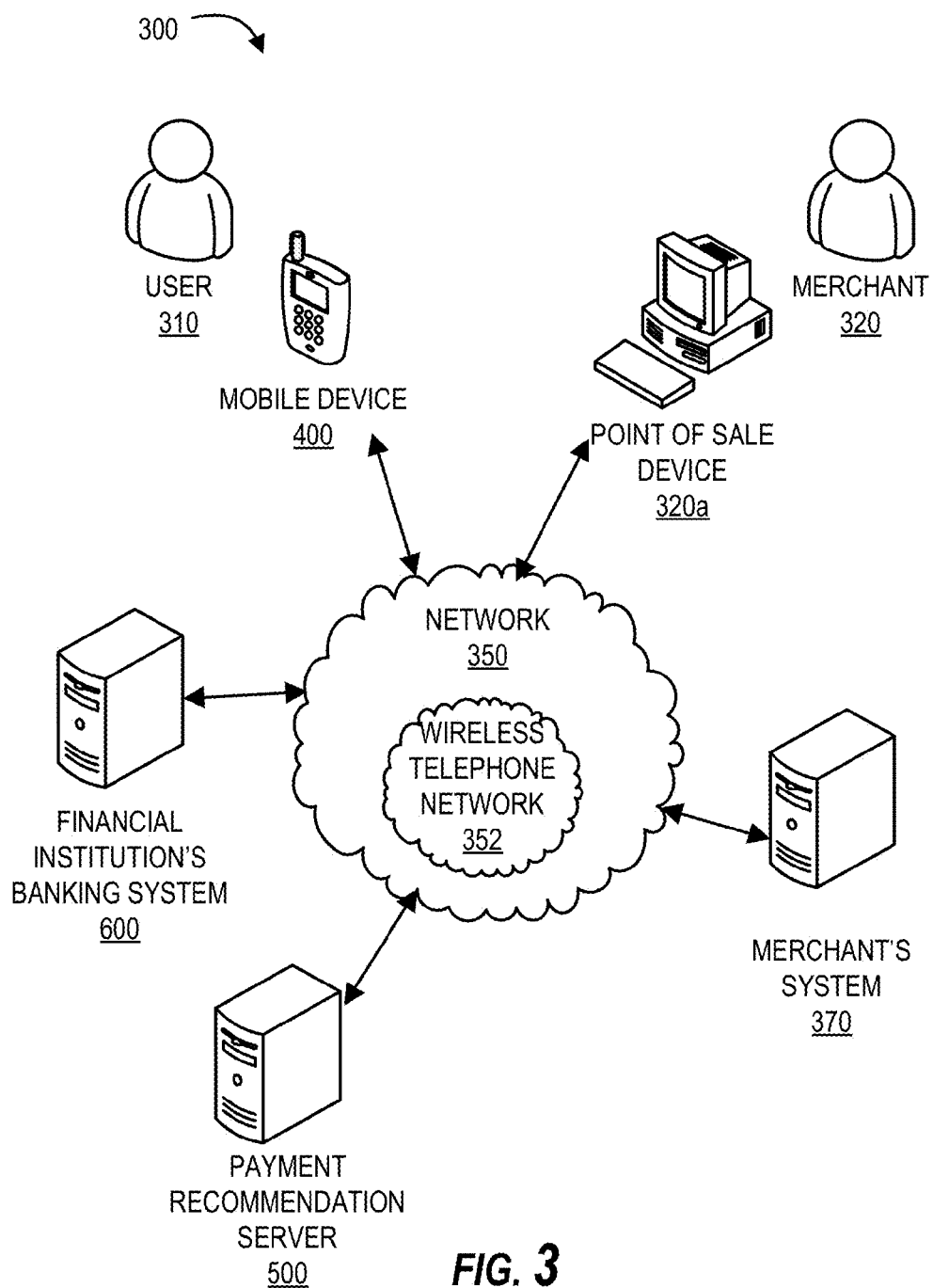
FIG. 3 is a payment recommendation system and environment in accordance with various embodiments of the invention.

FIG. 3 provides a block diagram illustrating a payment recommendation system and environment 300, in accordance with an embodiment of the invention. As illustrated in FIG. 3, the environment 300 includes the user 310 and the merchant 320 where the user and merchant are engaged in a transaction. Also included in the environment 300 is the user's mobile device 400 and the POS device 320a of the merchant 320. As used herein, a "mobile device" 400 is any mobile device, such as a cellular telecommunications device (i.e., a cell phone or mobile phone or smart phone), personal digital assistant (PDA), a mobile Internet accessing device, or other mobile device. In some embodiments, the mobile device 400 employs a processor and memory and can perform computing functions.

The mobile device 400 is configured to communicate over a network 350 with the financial institution's banking system 600 and, in some cases, the merchant's system 370. The network 350 may include a local area network (LAN), a wide area network (WAN), and/or a global area network (GAN). The network 350 may provide for wireline, wireless, or a combination of wireline and wireless communication between devices in the network. For example, in a "dock" embodiment, the network 350 enables physical placement or connection between two or more device, such as the mobile device 400 and the POS device 320a, to complete an interaction. In one embodiment, the network 350 includes the Internet. In one embodiment, the network 350 includes a wireless telephone network 352. In further embodiments, the network 350 includes a near field communication (NFC) network.

In general, the mobile device 400 is configured to connect with the network 350 to log the user 310 into the banking system 600. In some embodiments, the banking system 600 involves authentication of the user in order to access the user's account or mobile wallet application on the banking system 600. For example, the banking system 600 may be a system where the user 310 logs into his/her account or otherwise identifies and authenticates themselves such that the user 310 or other entity can access data that is associated with the user 310. In some embodiments, the banking system 600 is a mobile banking system maintained by a financial institution. In such an embodiment, the user 310 can use the mobile device 400 to log into the mobile banking system to access the user's financial accounts or mobile wallet application. Logging into the banking system 600 generally requires that the user 310 authenticate his/her identity using a user name, a passcode, a cookie, a biometric identifier, a private key, a token, and/or another authentication mechanism that is provided by the user 310 to the banking system 600.

The financial institution's banking system 600 is in network communication with other devices, such as the merchant's systems 370, a payment recommendation server 500, and the POS device 320a that is configured to communicate with the network 350 to log the merchant 320 into the banking system 600. In some embodiments, the point-of-sale device 320a is a Near-Field Communication (NFC), and/or wireless enabled device or another type of device capable of communicating with the mobile device 400 of the user 310. In some embodiments, the point-of-sale device 320a includes a NFC chip capable of authenticating with and/or communicating with another NFC chip in the vicinity of the point-of-sale device 320a. In further embodiments, the point-of-sale device 320a may be network-enabled and able to communicate with the user's device 400 over a wireless network or via Bluetooth™. In other embodiments, the point-of-sale device 320a communicates with the banking system 600, which in turn communicates the mobile device 400, and thus communication is enabled between all devices on the network 350 through relays.

Figure 4:
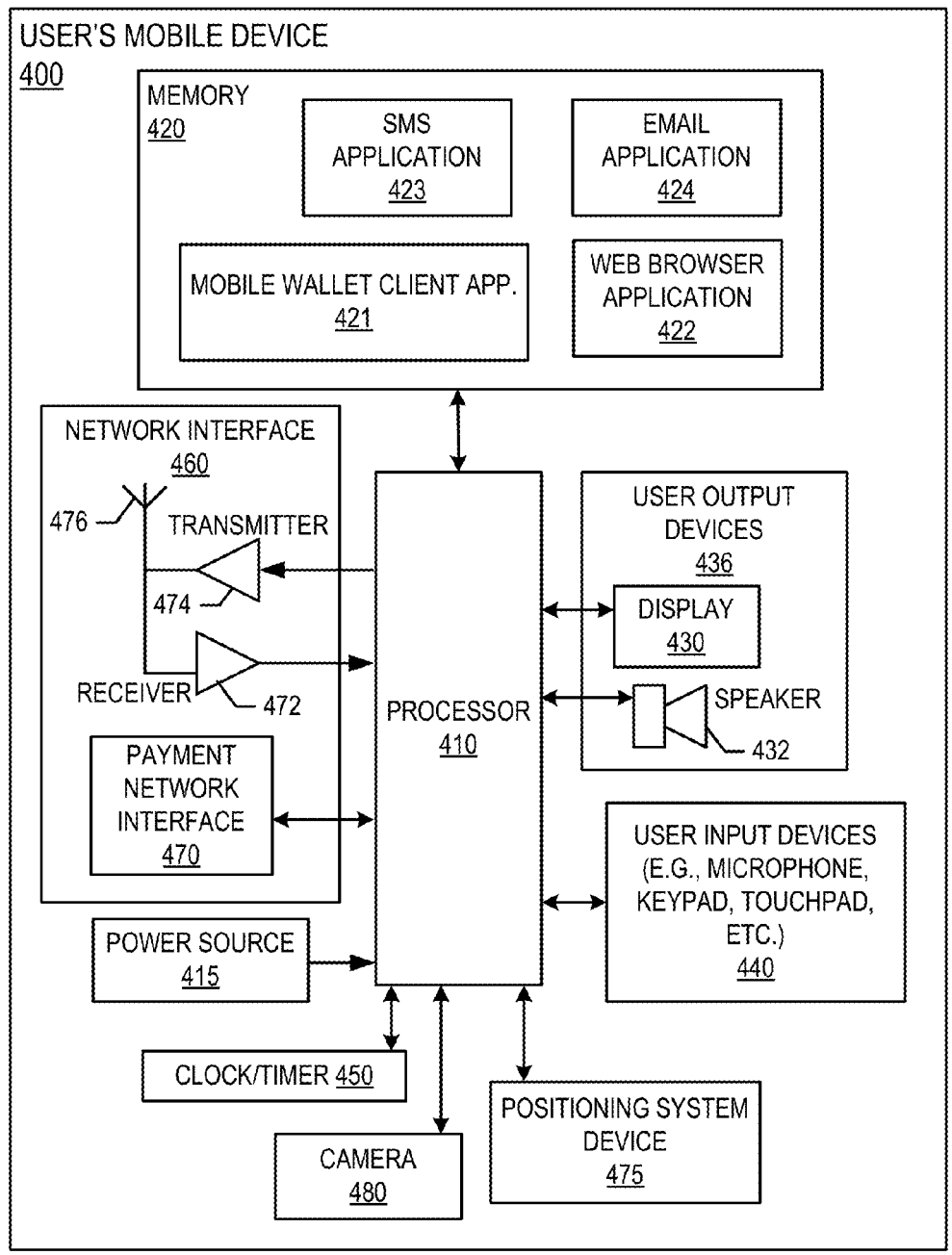
FIG. 4 provides a block diagram illustrating the user's computing device of FIG. 3, in accordance with various embodiments of the invention.

FIG. 4 provides a block diagram illustrating the mobile device 400 of FIG. 3 in more detail, in accordance with embodiments of the invention. In one embodiment of the invention, the mobile device 400 is a mobile telephone. However, it should be understood, however, that a mobile telephone is merely illustrative of one type of mobile device that may benefit from, employ, or otherwise be involved with embodiments of the present invention and, therefore, should not be taken to limit the scope of embodiments of the present invention. Other types of mobile devices 400 may include portable digital assistants (PDAs), pagers, mobile televisions, gaming devices, laptop computers, cameras, video recorders, audio/video player, radio, GPS devices, watches, jewelry, eyeglasses, biologically embedded devices or any combination of the aforementioned. Such devices may incorporate display and interaction technology or may relay on a system of component devices which interact to create a complete experience, such as an eyeglass-embedded display device paired to a smartphone.

The mobile device 400 generally includes a processor 410 communicably coupled to such devices as a memory 420, user output devices 436, user input devices 440, a network interface 460, a power source 415, a clock or other timer 450, a camera 480, and a positioning system device 475. These components may be coupled in a single device or dispersed across multiple devices which can communicate and interact. In an embodiment, the network interface 460 includes a Near Field Communication device capable of communicating with and authenticating other NFC enabled devices. The NFC device is capable of short range wireless transfer of data. In some embodiments, the range of the NFC signal is intentionally attenuated such that the NFC signal is unlikely to be accessible or intercepted by any NFC or radio devices other than the NFC device that the user touches with the mobile device. In some embodiments, the NFC device generates a radio frequency (RF) field that is capable of powering another NFC device. In one embodiment, the NFC device on the mobile device is powered, such as by the power source for the mobile device or by a dedicated power source. In another embodiment, the NFC device on the mobile device is not powered and receives power from the NFC device associated with the point-of-sale device. In a still further embodiment, both the NFC device on the mobile device and the NFC device on the point-of-sale device are actively powered. In an embodiment, the NFC device on the mobile device does not need to be paired with the NFC device at the point-of-sale prior to transferring data. In some embodiments, the NFC device encrypts the data prior to transferring the data.

The processor 410 and other processors described herein generally include circuitry for implementing communication and/or logic functions of the mobile device 400. For example, the processor 410 may include a digital signal processor device, a microprocessor device, and various analog to digital converters, digital to analog converters, and/or other support circuits. Control and signal processing functions of the mobile device 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the mobile device 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 350. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless telephone network 352. In this regard, the mobile device 400 may be configured to operate with one or more air interface standards, communication protocols, modulation types, and access types. By way of illustration, the mobile device 400 may be configured to operate in accordance with any of a number of first, second, third, and/or fourth-generation communication protocols and/or the like. For example, the mobile device 400 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The mobile device 400 may also be configured to operate in accordance with non-cellular communication mechanisms, such as via a wireless local area network (WLAN), Bluetooth™ network, or other communication/data networks.

The network interface 460 may also include a payment network interface 470. The payment network interface 470 may include software, such as encryption software, and hardware, such as a modem, for communicating information to and/or from one or more devices on the network 350. For example, the mobile device 400 may be configured so that it can be used as a credit or debit card by, for example, wirelessly communicating account numbers or other authentication information to a terminal of the network 350.

As described above, the mobile device 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410. The user input devices 440, which allow the mobile device 400 to receive data from a user such as the user 310, may include any of a number of devices allowing the mobile device 400 to receive data from a user, such as a keypad, keyboard, touch-screen, touchpad, microphone, mouse, joystick, other pointer device, button, soft key, and/or other input device(s). The user interface may also include a camera 480, such as a digital camera.

The mobile device 400 may also include the positioning system device 475 that is configured to be used by a positioning system to determine a location of the mobile device 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate location of the mobile device 400. In other embodiments, the positioning system device 475 includes a proximity sensor or transmitter, such as an RFID tag, that can sense or be sensed by devices known to be located proximate a merchant or other location to determine that the consumer mobile device 400 is located proximate these known devices. Location data may be used to interact with the payment method selection algorithm, for instance in determining whether a State benefits program may be eligible for use at a merchant location.

The mobile device 400 further includes a power source 415, such as a battery, for powering various circuits and other devices that are used to operate the mobile device 400. Embodiments of the mobile device 400 may also include a clock or other timer 450 configured to determine and, in some cases, communicate actual or relative time to the processor 410 or one or more other devices.

The mobile device 400 also includes the memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the mobile device 400 described herein. For example, the memory 420 may include such applications as a conventional web browser application 422, an SMS (short message service) application 423, an email application 424, and/or a mobile wallet client application 421. These applications also typically provide a graphical user interface (GUI) on the display 430 that allows the user 310 to communicate with the consumer mobile device 400, the banking system 600, and/or other devices or systems. In one embodiment of the invention, when the user 310 decides to enroll in the mobile wallet program, the user 310 downloads or otherwise obtains the mobile wallet client application from the banking system 600 or from a distinct application server. In other embodiments of the invention, the user 310 interacts with the banking system 600 via the web browser application 422 in addition to, or instead of, the mobile wallet client application 421.

The memory 420 can also store any of a number of pieces of information, and data, used by the mobile device 400 and the applications and devices that make up the mobile device 400 or are in communication with the mobile device 400 to implement the functions of the mobile device 400 and/or the other systems described herein. For example, the memory 420 may include such data as user authentication information, etc.

Figure 5:
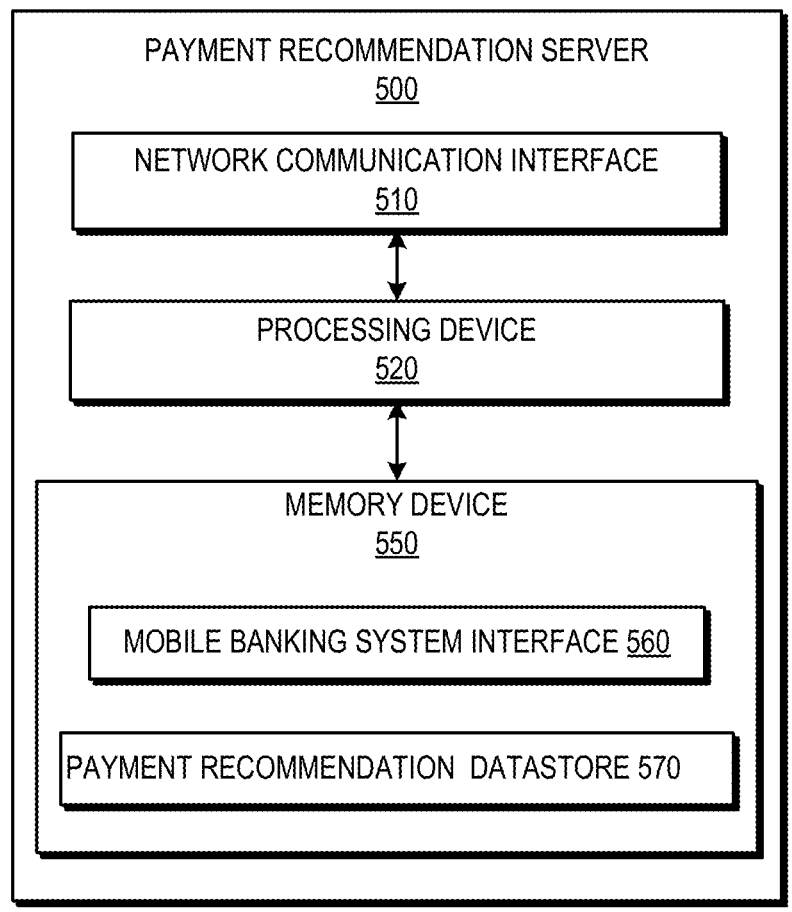
FIG. 5 provides a block diagram illustrating the payment recommendation server of FIG. 3, in accordance with various embodiments of the invention.

FIG. 5 provides a block diagram illustrating the payment recommendation server 500 of FIG. 3, in accordance with an embodiment of the invention. In one embodiment of the invention, the payment recommendation server 500 is operated by a second entity that is a different or separate entity from the first entity (e.g., the financial institution) that, in one embodiment of the invention, implements the banking system 600. In one embodiment, the payment recommendation server 500 could be part of the banking system 600. In another embodiment, the payment recommendation server 500 is a distinct entity from the banking system 600. As illustrated in FIG. 5, the payment recommendation server 500 generally includes, but is not limited to, a network communication interface 510, a processing device 520, and a memory device 550. The processing device 520 is operatively coupled to the network communication interface 510 and the memory device 550. In one embodiment of the payment recommendation server 500, the memory device 550 stores, but is not limited to, a mobile banking system interface 560 and a payment recommendation datastore 570. The payment recommendation datastore 570 stores data including, but not limited to, a payment vehicles available to the user 310, account information associated with the payment vehicles, payment rules, and the like. In one embodiment of the invention, both the mobile banking system interface 560 and the payment recommendation datastore 570 may associate with applications having computer-executable program code that instructs the processing device 520 to operate the network communication interface 510 to perform certain communication functions involving the payment recommendation datastore 570 described herein. In one embodiment, the computer-executable program code of an application associated with the payment recommendation datastore 570 may also instruct the processing device 520 to perform certain logic, data processing, and data storing functions of the application associated with the alias data store 570 described herein.

The network communication interface 510 is a communication interface having one or more communication devices configured to communicate with one or more other devices on the network 350. The processing device 520 is configured to use the network communication interface 510 to receive information from and/or provide information and commands to the user's mobile device 400, merchant's systems 370, the payment recommendation server 500, the banking system 600, and/or other devices via the network 350. In some embodiments, the processing device 520 also uses the network communication interface 510 to access other devices on the network 350, such as one or more web servers of one or more third-party data providers. In some embodiments, one or more of the devices described herein may be operated by a second entity so that the third-party controls the various functions involving the alias determination server 500. For example, in one embodiment of the invention, although the banking system 600 is operated by a first entity (e.g., a financial institution), a second entity operates the payment recommendation server 500 that determines the payment vehicle recommendation.

As described above, the processing device 520 is configured to use the network communication interface 510 to gather data from the various data sources. The processing device 520 stores the data that it receives in the memory device 550. In this regard, in one embodiment of the invention, the memory device 550 includes datastores that include, for example: (1) transaction data, (2) algorithms for determining payment vehicles (3) information about sending and receiving users' mobile device numbers, email addresses, customer support phone numbers, or other contact information, which may have been received from the banking system 600; (4) a list of user IDs or authentication data received from the banking system 600; (5) payment rules; and/or (6) user credentials (e.g., a user or merchant's public key or a user ID) received from the user's mobile device 400 or received from the banking system 600, POS device 320*a*, or the merchant's server 370 in response to the user initiating a transaction.

In some embodiments of the invention, the payment recommendation server 500 is configured to be controlled and managed by one or more third-party data providers (not shown in FIG. 3) over the network 350. In other embodiments, the payment recommendation server 500 is configured to be controlled and managed over the network 350 by the same entity that maintains the financial institution's banking system. In other embodiments, the payment recommendation server 500 is configured to be controlled and managed over the network 350 by the financial institution implementing the mobile payment system of the present invention. In still other embodiments, the payment recommendation server 500 is a part of the banking system 600.

Figure 6:
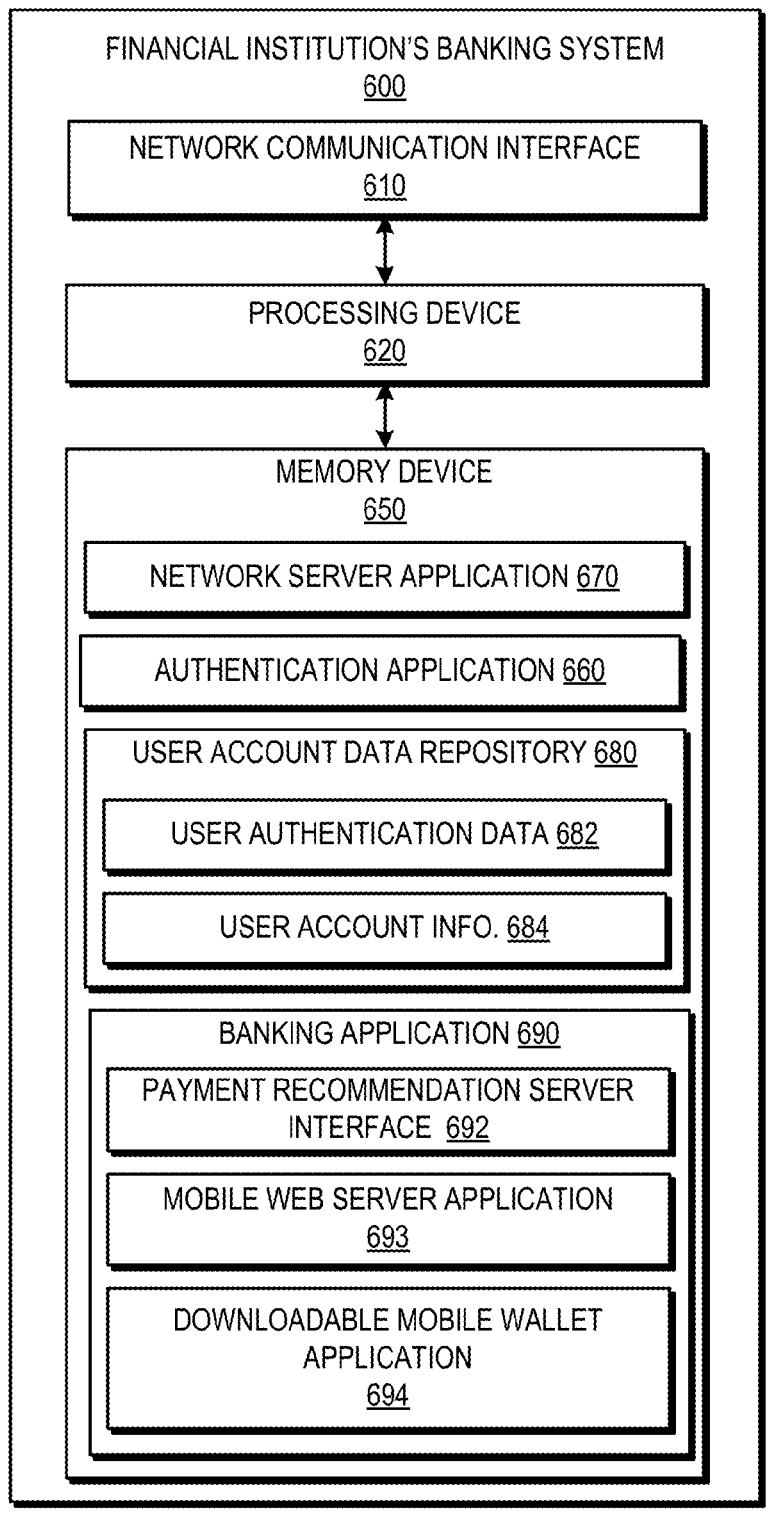
FIG. 6 provides a block diagram illustrating the financial institution's banking system of FIG. 3, in accordance with various embodiments of the invention.

FIG. 6 provides a block diagram illustrating the banking system 600 of FIG. 3 in greater detail, in accordance with embodiments of the invention. As illustrated in FIG. 6, in one embodiment of the invention, the banking system 600 includes a processing device 620 operatively coupled to a network communication interface 610 and a memory device 650. In certain embodiments, the banking system 600 is operated by a first entity, such as a financial institution, while in other embodiments the banking system 600 is operated by an entity other than a financial institution.

It should be understood that the memory device 650 may include one or more databases or other data structures/repositories. The memory device 650 also includes computer-executable program code that instructs the processing device 620 to operate the network communication interface 610 to perform certain communication functions of the banking system 600 described herein. For example, in one embodiment of the banking system 600, the memory device 650 includes, but is not limited to, a network server application 670, an authentication application 660, a user account data repository 680, which includes user account data repository 680 and user account information 684, a banking application 690, which includes a payment recommendation interface 692, a mobile web server application 693, a downloadable mobile wallet application 694, and other computer-executable instructions or other data. In some embodiments the banking application 690 comprises a mobile web server application 693 that allows the user to change the static alias. The computer-executable program code of the network server application 670, the authentication application 660, or the banking application 690 may instruct the processing device 620 to perform certain logic, data-processing, and data-storing functions of the banking system 600 described herein, as well as communication functions of the banking system 600.

In one embodiment, the user account data repository 680 includes user authentication data 682 and user account information 684. The network server application 670, the authentication application 660, and the banking application 690 are configured to implement user account information 684 in collaboration with the user authentication data 682 and the payment recommendation interface 692 when authenticating the user 310 to the banking system 600.

As used herein, a "communication interface" generally includes a modem, server, transceiver, and/or other device for communicating with other devices on a network, and/or a user interface for communicating with one or more users. Referring again to FIG. 6, the network communication interface 610 is a communication interface having one or more communication devices configured to communicate with one or more other devices on the network 350, such as the mobile device 400, the banking system 600, the other financial institution banking systems 370, and the alias determination server 500. The processing device 620 is configured to use the network communication interface 610 to transmit and/or receive data and/or commands to and/or from the other devices connected to the network 350.

Figure 7A:
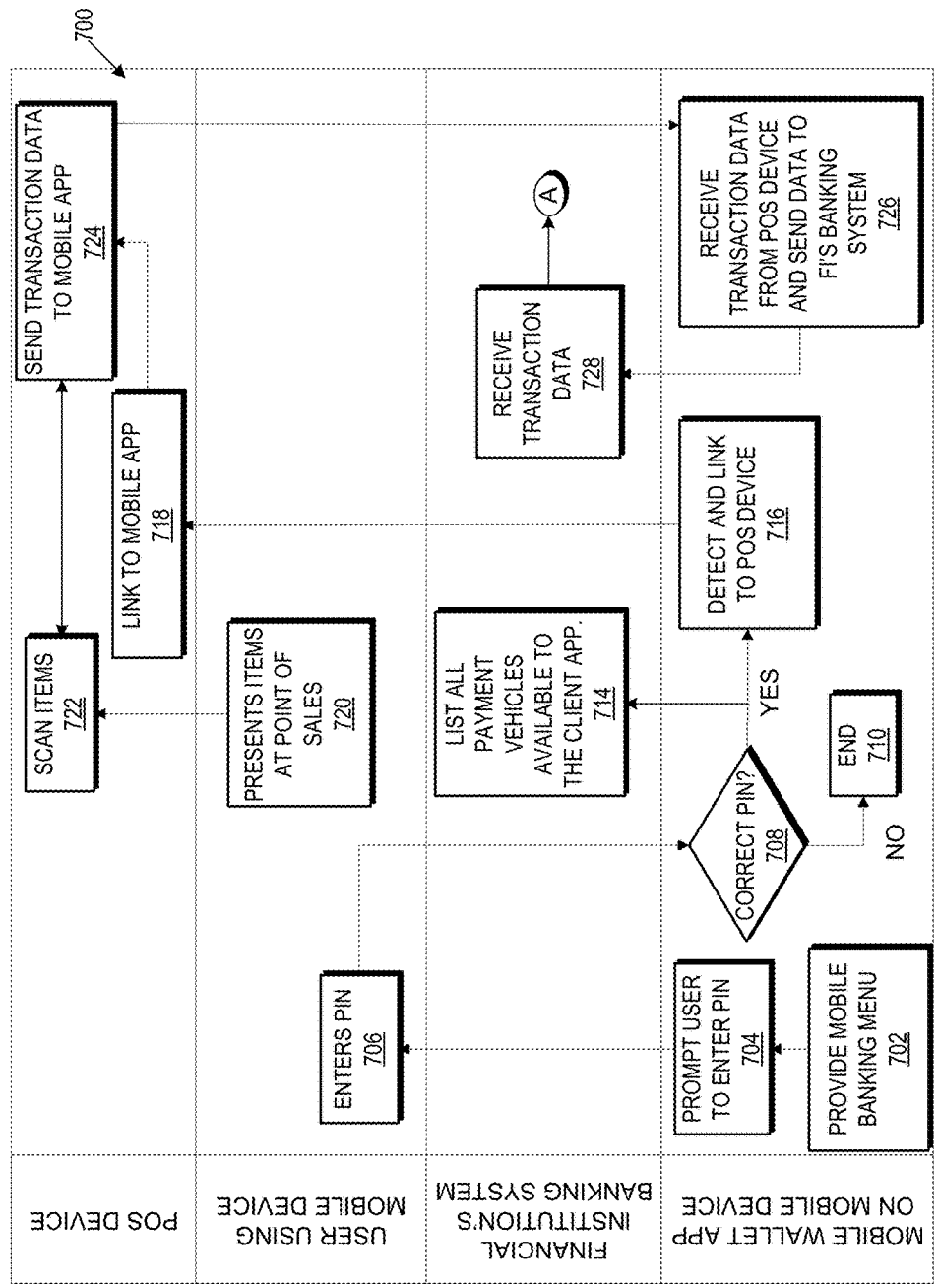
FIGS. 7A-7B are flowcharts illustrating a process for recommending payment vehicles in accordance with various embodiments of the invention.
Figure 7B:
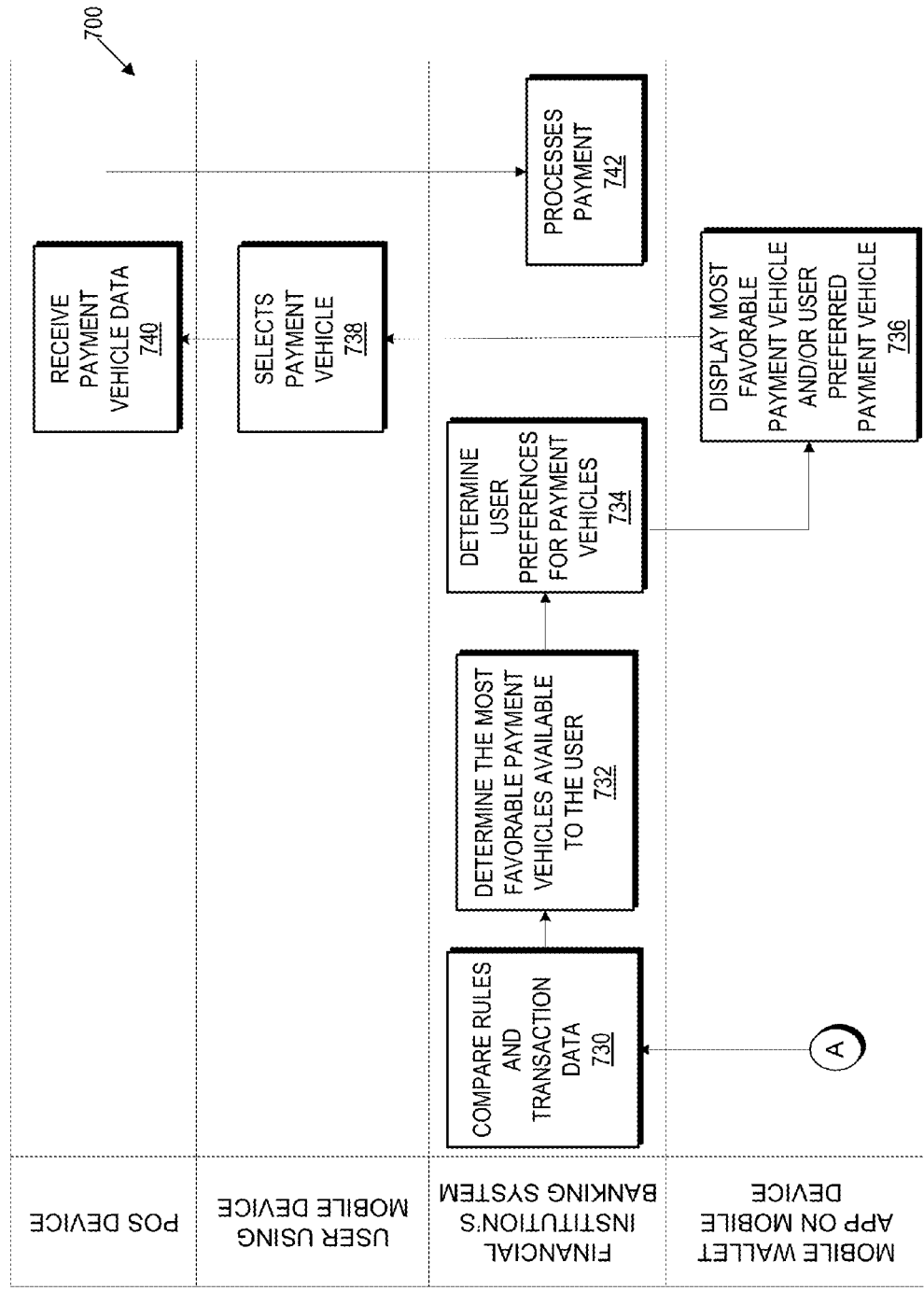

Referring now to FIGS. 7A-7B, flowcharts illustrating a process 700 for recommending payment vehicles are provided. As illustrated at block 702, a mobile wallet application on a mobile device of a user (e.g., the user's mobile device 400) provides a mobile payments menu. As illustrated at block 704, the mobile wallet application prompts the user to enter a PIN, such as a code of numbers, letters, and/or symbols. In some embodiments, other methods of authentication, such as biometric techniques, are used. A user using the mobile device enters the PIN in a designated field as shown in block 706.

As illustrated at block 708, the mobile wallet application determines if the PIN is correct. The mobile wallet application ends the process if the PIN is incorrect (block 710). If the PIN is correct, a financial institution's banking system lists all payment vehicles available to the mobile wallet application as shown in block 714, and/or the mobile wallet application detects and links to a POS device as shown in block 716. The mobile wallet application may use a geo-positioning device stored in the mobile device to determine the location of the mobile device and send location data to the POS device. In some embodiments, the mobile wallet application is set up to automatically detect the POS device through NFC or wireless technologies. In other embodiments, a user uses the mobile device's camera to scan a QR or other machine-readable code displayed by the POS device in order to link to the POS device. As illustrated at block 718, the POS device links to the mobile device.

As illustrated at block 720, the user presents items for purchase at the point of sale. In some embodiments, the user uses the mobile wallet application to scan the products that the user intends to purchase (e.g., using a bar code reader) when the user navigates through the store. In this way, the mobile wallet application receives product data directly. The user may link to the POS device, such as by tapping the POS device prior to exiting the store to pay for the items the user scanned. As illustrated at block 722, the POS device scans the items. As the products are scanned, the POS device sends transaction data to the mobile wallet application as shown in block 724. As illustrated at block 726, the mobile wallet application receives the transaction data from the POS device and sends the transaction data to the financial institution's banking system. In other embodiments, the baking system is in communication with the POS device and receives at least some of the transaction data from the POS device. As illustrated at block 728, the banking system receives the transaction data. In some embodiments, some or all of the actions performed by the financial institution's banking system in FIGS. 7A-7B can also be performed by a payment recommendation server (e.g., the server 500).

Referring now to FIG. 7B, the process 700 is further illustrated. As illustrated at block 730, the banking system compares payment rules and the transaction data. As illustrated at block 732, the banking system determines the most favorable payment vehicles available to the user. And as illustrated at block 734, the banking system determines user preferences for payment vehicles. Blocks 730-734 are described in more detail with regard to FIGS. 1A-1B.

The mobile wallet application displays the most favorable payment vehicle and/or user preferred payment vehicle in block 736. As illustrated at block 738, the user selects the payment vehicle. The user may, for example, tap on the NFC enabled POS device using the mobile device to complete payment. As illustrated at block 740, the POS device received payment vehicle data and the banking system processes the payment as shown in block 742.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated. Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A system for providing payment vehicle recommendations to a user, the system comprising:
   a computer apparatus including a processor and a memory; and
   a payment software module stored in the memory, comprising executable instructions that when executed by the processor cause the processor to:
   receive transaction data comprising at least one merchant and codes segregated according to the user's eligibility under one or more user enrolled government programs;
   identify transactions associated with one or more transaction parameters included in the transaction data and the codes;
   identify one or more payment rules associated with the user, the one or more payment rules comprising at least government consumer protection laws, the user enrolled government programs, and government regulations;

compare the terms of the one or more payment rules with the one or more transaction parameters and codes;

determine the payment vehicles that meet the terms of the one or more payment rules based on the comparison of the terms of the one or more payment rules and the one or more transaction parameters;

determine that a first merchant is not authorized to process at least one of the payment vehicles that meet the terms of the government regulations;

determine that a second merchant applies polices that are unfavorable to the user; and provide on a display of a mobile device of the user that is in communication with the system a first recommendation that does not include the at least one payment vehicle that meets the terms of the government regulations and a second recommendation that comprises at least another payment vehicle that complies with the government consumer protection laws.

2. The system of claim 1, wherein the one or more transaction parameters comprise one of a transaction amount and purchase items.

3. The system of claim 2, wherein the module is further configured to:
identify payment vehicles that are associated with the mobile device; and
calculate account balances of the payment vehicles.

4. The system of claim 2, wherein the module is further configured to:
determine that the each of the account balances is greater than the transaction amount, wherein the transaction amount comprises a total transaction amount.

5. The system of claim 2, wherein the module is further configured to:
determine that the transaction amount is less than each of the account balances; and
provide a notice to the user on the display of the mobile device.

6. The system of claim 4, wherein the module is further configured to:
identify payment vehicles available to the user that are external to the mobile device;
recommend the external payment vehicles to the user.

7. The system of claim 2, wherein the module is further configured to:
segregate the purchase items into one or more categories; and
calculate the total transaction amount of each of the one or more categories.

8. The system of claim 7, wherein the module is further configured to:
calculate a first account balance of a first payment vehicle;
determine that the first account balance is greater than the total transaction amount of a first category of the one or more categories;
recommend the first payment vehicle to the user;
calculate a second account balance of a second payment vehicle;
determine that the second account balance is greater than the total transaction amount of a second category of the one or more categories; and
recommend the second payment vehicle to the user.

9. The system of claim 2, wherein the module is further configured to:
segregate the purchase items into a first category of item types and a second category of item types; and
determine that the first category of item types are eligible under the terms of a first payment rule and that the second category of item types are eligible under the terms of a second payment rule, wherein the at least one payment vehicle comprises a first payment vehicle associated with the first payment rule and a second payment vehicle associated with the second payment rule to the user.

10. The system of claim 9, wherein the first category of item types is associated with a first merchant and the second category of item types is associated with a second merchant.

11. The system of claim 2, wherein the one or more transaction parameters comprise a period of time, a transaction frequency, or a merchant.

12. The system of claim 11, wherein the module is further configured to:
compare the terms of the one or more payment rules with the merchant; and
determine that the merchant is eligible under the terms of the one or more payment rules, wherein the at least one payment vehicle comprises a payment vehicle that is accepted by the merchant.

13. The system of claim 11, wherein the module is further configured to:
determine a second transaction;
identify second purchase items associated with the second transaction; and
determine that the first purchase items comprise at least one of the second purchase items, wherein the at least one payment vehicle comprises a payment vehicle used in the second transaction and wherein the second transaction occurs prior to the first transaction.

14. A method for providing payment vehicle recommendations to a user, the method comprising:
receiving transaction data comprising at least one merchant and codes segregated according to the user's eligibility under one or more user enrolled government programs;
identifying, via a computer device processor, transactions associated with one or more transaction parameters based on the transaction data; and the codes
identifying, via a computer device processor, one or more payment rules associated with the transaction, the one or more payment rules comprising at least government consumer protection laws, user enrolled government programs, and government regulations;
comparing, via a computer device processor, the terms of the one or more payment rules and the one or more transaction parameters;
determining, via a computer device processor, the payment vehicles for the transaction that meet the terms of the one or more payment rules based on the comparison of the terms of the one or more payment rules and the one or more transaction parameters;
determining, via a computer device processor, that a first merchant is not authorized to process at least one of the payment vehicles that meet the terms of the government regulations;
determining, via a computer device processor, that a second merchant applies polices that are unfavorable to the user; and
providing on a display of a mobile device of the user, via a computer device processor, a first recommendation that does not include that at least one payment vehicle that meet the terms of the government regulations and a second recommendation that comprises at least another payment vehicle that complies with the government consumer protection laws.

15. The method of claim 14, wherein the transaction is associated with a period of time, a transaction frequency, or a merchant.

16. The method of claim 15, further comprising:
determining, via a computer device processor, that a first payment vehicle has been used at least once during the period of time;
determining, via a computer device processor, that a second payment vehicle has not been used during the period of time;
comparing the terms of the payment rule to the transaction frequency of the first payment vehicle and the second payment vehicle, wherein the at least one payment vehicle comprises the second payment vehicle.

17. The method of claim 14, further comprising:
segregating purchase items of the transaction into a first category of item types and a second category of item types; and
determining that the first category of item types are eligible under the terms of a first payment rule and that the second category of item types are eligible under the terms of a second payment rule.

18. The method of claim 14, wherein the transaction data is received from a point of sales device.

19. A computer program product for providing payment vehicle recommendations to a user, the computer program product comprising:
a non-transitory computer readable storage medium having computer readable program code embodied therewith, the computer readable program code comprising:
a computer readable program code configured to receive transaction data comprising at least one merchant and codes segregated according to the user's eligibility under one or more user enrolled government programs;
a computer readable program code configured to identify transactions associated with one or more transaction parameters included in the transaction data and the codes;
a computer readable program code configured to identify one or more payment rules associated with the transaction, the one or more payment rules comprising at least government consumer protection laws, the user enrolled government programs, and government regulations;
a computer readable program code configured to compare the terms of the one or more payment rules with the one or more transaction parameters;
a computer readable program code configured to determine the payment vehicles that meets the terms of the one or more payment rules based on the comparison of the terms of the one or more payment rules and the one or more transaction parameters;
a computer readable program code configured to determine that a first merchant is not authorized to process at least one of the payment vehicles that meet the terms of the government regulations and determine that a second merchant applies polices that are unfavorable to the user; and
a computer readable program code configured to provide on a display of a mobile device of the user a first recommendation that does not include that at least one payment vehicle that meet the terms of the government regulations and a second recommendation that comprises at least another payment vehicle that complies with the government consumer protection laws.

20. The computer program product of claim 19, further comprising computer readable program code configured to calculate account balances of the payment vehicles; determine that the each of the account balances is greater than a transaction amount.

* * * * *